(12) United States Patent
Collison et al.

(10) Patent No.: US 12,077,969 B2
(45) Date of Patent: Sep. 3, 2024

(54) FLOOR LIFT LAYER PROVIDING RIGIDITY, SOUND REDUCTION, AND THERMAL INSULATION

(71) Applicant: MP Global Products, L.L.C., Norfolk, NE (US)

(72) Inventors: Alan B. Collison, Pierce, NE (US); Carl Fuelberth, Norfolk, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

(21) Appl. No.: 18/100,838

(22) Filed: Jan. 24, 2023

(65) Prior Publication Data
US 2023/0243162 A1 Aug. 3, 2023

Related U.S. Application Data

(60) Provisional application No. 63/304,421, filed on Jan. 28, 2022.

(51) Int. Cl.
| | |
|---|---|
| *E04F 15/22* | (2006.01) |
| *B32B 5/02* | (2006.01) |
| *B32B 7/12* | (2006.01) |
| *B32B 27/12* | (2006.01) |
| *E04F 15/20* | (2006.01) |

(52) U.S. Cl.
CPC .............. *E04F 15/203* (2013.01); *B32B 5/02* (2013.01); *B32B 7/12* (2013.01); *B32B 27/12* (2013.01); *B32B 2262/0276* (2013.01); *B32B 2307/102* (2013.01); *B32B 2307/304* (2013.01); *B32B 2307/3065* (2013.01); *B32B 2307/718* (2013.01); *B32B 2307/72* (2013.01); *B32B 2307/7246* (2013.01); *B32B 2307/732* (2013.01); *B32B 2471/00* (2013.01)

(58) Field of Classification Search
CPC .. E04F 15/203; B32B 5/02; B32B 2262/0276; B32B 2471/00
See application file for complete search history.

(56) References Cited

U.S. PATENT DOCUMENTS

| | | | |
|---|---|---|---|
| 11,447,962 B2* | 9/2022 | Collison | B32B 7/12 |
| 2012/0308795 A1* | 12/2012 | Hauber | B32B 5/022 |
| | | | 428/218 |
| 2014/0127451 A1* | 5/2014 | Pilpel | B32B 5/12 |
| | | | 428/113 |
| 2017/0362837 A1* | 12/2017 | Shugg | B32B 27/36 |
| 2019/0383032 A1* | 12/2019 | Hascher | B32B 5/26 |

* cited by examiner

*Primary Examiner* — Basil S Katcheves
(74) *Attorney, Agent, or Firm* — Harness, Dickey & Pierce, P.L.C.

(57) ABSTRACT

A floor structure includes a subfloor, a floor covering disposed above the subfloor, and a floor lift layer disposed between the subfloor and the floor covering. The floor covering is disposed above the subfloor. The floor lift layer is a fiber structure that includes a substrate fiber bound together by a thermoplastic binder fiber. The thermoplastic binder fiber makes up between 25 percent (%) and 35% by weight of the floor lift layer.

19 Claims, 2 Drawing Sheets

FLOOR LIFT LAYER PROVIDING RIGIDITY, SOUND REDUCTION, AND THERMAL INSULATION

CROSS-REFERENCE TO RELATED APPLICATIONS

This application claims the benefit of U.S. Provisional Application No. 63/304,421, filed on Jan. 28, 2022. The entire disclosure of the above application is incorporated herein by reference.

FIELD

The present disclosure relates to floor lift layers providing rigidity, sound reduction, and thermal insulation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A floor covering is the top or finished layer of a floor structure. Many types of floor coverings are used today including wood, laminate, and tile. In some cases, a thicker floor covering is replaced by a thinner floor covering, which yields a gap between the thinner floor covering and wall trim disposed above the thinner floor covering. The thinner floor covering can also yield a trip hazard at the transition between the thinner floor covering and adjacent, thicker floor covering that has not been replaced.

A floor lift layer is placed between a thinner floor covering and a subfloor to eliminate a gap between the thinner floor covering and wall trim. Floor lift layers are typically made of plywood, cork, or rubber, and are therefore heavy and provide minimal sound reduction and thermal insulation.

SUMMARY

This section provides a general summary of the disclosure, and is not a comprehensive disclosure of its full scope or all of its features.

A floor structure according to the present disclosure includes a subfloor, a floor covering disposed above the subfloor, and a floor lift layer disposed between the subfloor and the floor covering. The floor lift layer is a fiber structure that includes a substrate fiber bound together by a thermoplastic binder fiber. In one example, the thermoplastic binder fiber makes up between 25 percent (%) and 35% by weight of the floor lift layer.

In one aspect, the substrate fiber includes polyethylene terephthalate (PET) fiber, polypropylene (PP) fiber, nylon fiber, or combinations thereof.

In one aspect, the substrate fiber includes short PET fiber having a length within a range from 2 millimeters (mm) to 10 mm and long PET fiber having a length within a range from 10 mm to 20 mm.

In one aspect, the floor lift layer includes between 28% and 68% by weight of the short PET fiber.

In one aspect, the substrate fiber further includes PP fiber and nylon fiber.

In one aspect, the floor lift layer includes between 43% and 53% by weight of the short PET fiber and between 25% and 35% by weight of the thermoplastic binder fiber.

In one aspect, the floor structure further includes a vapor barrier film attached to at least one of a top surface of the floor lift layer and a bottom surface of the floor lift layer.

In one aspect, the floor lift layer and the vapor barrier film attached thereto have a permeability rating of less than 0.1.

In one aspect, at least one of the substrate fiber and the thermoplastic binder fiber is treated with a fire retardant coating and/or the substrate fiber includes fiber that is naturally a fire retardant.

In another example, the floor lift layer is sufficiently rigid to avoid damage to the floor covering due to the floor lift layer compressing under the pressure of normal use, and the floor lift layer is compressible to reduce a thickness thereof during installation.

In one aspect, the floor lift layer has a compression resistance within a range from 450 pounds per square inch (psi) at 50% compression to 525 psi at 50% compression.

In one aspect, the floor lift layer has a density within a range from 18 pounds per cubic feet (lb./ft$^3$) to 24 lb./ft$^3$.

In one aspect, the floor lift layer has one of (i) a thickness of ⅛ in. and a weight from 1500 grams per square meter (GSM) to 2000 GSM, (ii) a thickness of ¼ in. and a weight from 2000 GSM to 3000 GSM, and (iii) a thickness of ½ in. and a weight from 4500 GSM to 5000 GSM.

In one aspect, the floor lift layer has at least one of (i) an impact insulation class (IIC) within a range from 55 to 80, a sound transmission class (STC) within a range from 52 to 75, and a delta IIC within a range from 22 to 28.

In one aspect, the floor lift layer has an R-value within a range from 3.5 to 4 per inch (in.).

In one aspect, the floor lift layer has a thickness within a range from ⅛ in. to ½ in.

The present application also discloses a method of replacing a first floor covering having a first thickness with a second floor covering having a second thickness that is less than the first thickness. In one example, the method includes removing the first floor covering from a subfloor, installing a floor lift layer onto the subfloor, and installing the second floor covering onto the floor lift layer. The floor lift layer has a third thickness that is greater than or equal to a difference between the first and second thicknesses. The floor lift layer comprises a fiber structure that includes a substrate fiber bound together by a thermoplastic binder fiber.

In one aspect, the third thickness is greater than the difference between the first and second thicknesses, and the method further includes compressing the floor lift layer to fit the floor lift layer and the second floor covering within a gap between the subfloor and wall trim.

In one aspect, the thermoplastic binder fiber makes up between 25% and 35% by weight of the floor lift layer.

In one aspect, the floor lift layer has a compression resistance within a range from 450 psi at 50% compression to 525 psi at 50% compression.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
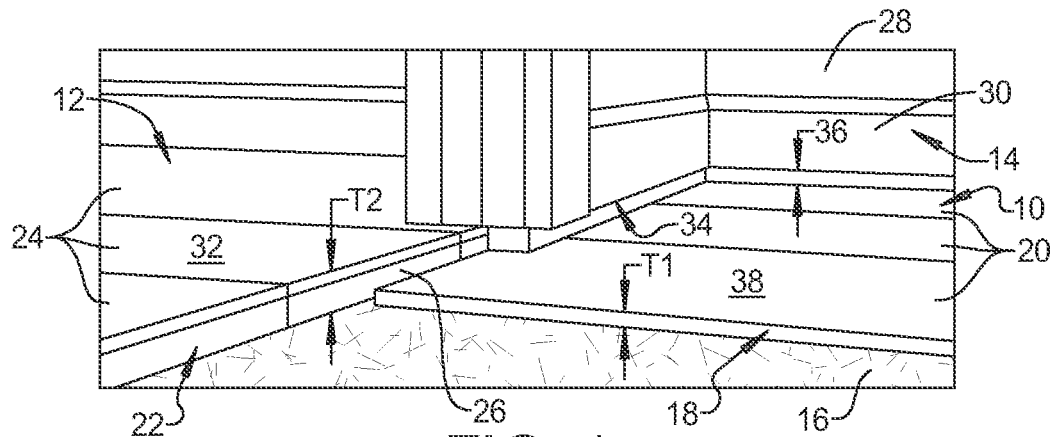
FIG. 1 is a partially sectioned perspective view of a floor structure according to the prior art including a thin floor covering that yields a large gap between wall trim and the floor structure.

Referring now to FIG. 1, a floor structure 10 according to the prior art is shown adjacent to another floor structure 12 and a wall structure 14. The floor structure 10 includes a subfloor 16 and a floor covering 18 disposed over the subfloor 16. The subfloor 16 includes sheets of plywood. The floor covering 18 includes engineered hardwood or laminate planks 20 having a thickness T1.

The floor structure 12 includes the subfloor 16 and a floor covering 22 disposed over the subfloor 16. In one example, the floor covering 22 of the floor structure 12 is similar or identical to a floor covering replaced by the floor covering 18 of the floor structure 10. The floor covering 22 includes natural hardwood planks 24 having a thickness T2. The thickness T2 of the floor covering 22 is greater than the thickness T1 of the floor covering 18, which exposes a side surface 26 of the floor covering 22. The exposed side surface 26 of the floor covering 22 creates a trip hazard for individuals transitioning from walking on the floor covering 18 to walking on the floor covering 22.

The wall structure 14 includes a wall covering 28, such as drywall or plaster, and trim 30 disposed over the wall covering 28. The trim 30 may include pieces of natural wood. The trim 30 extends over the floor structure 10 and the floor structure 12, and the trim 30 seats flush on the floor covering 22 of the floor structure 12 with little to no gap between a top surface 32 of the floor covering 22 and a bottom surface 34 of the trim 30. However, since the thickness T2 of the floor covering 22 is greater than the thickness T1 of the floor covering 18, there is a gap 36 between a top surface 38 of the floor covering 18 and the bottom surface 34 of the trim 30. The gap 36 is aesthetically displeasing.

Figure 2:
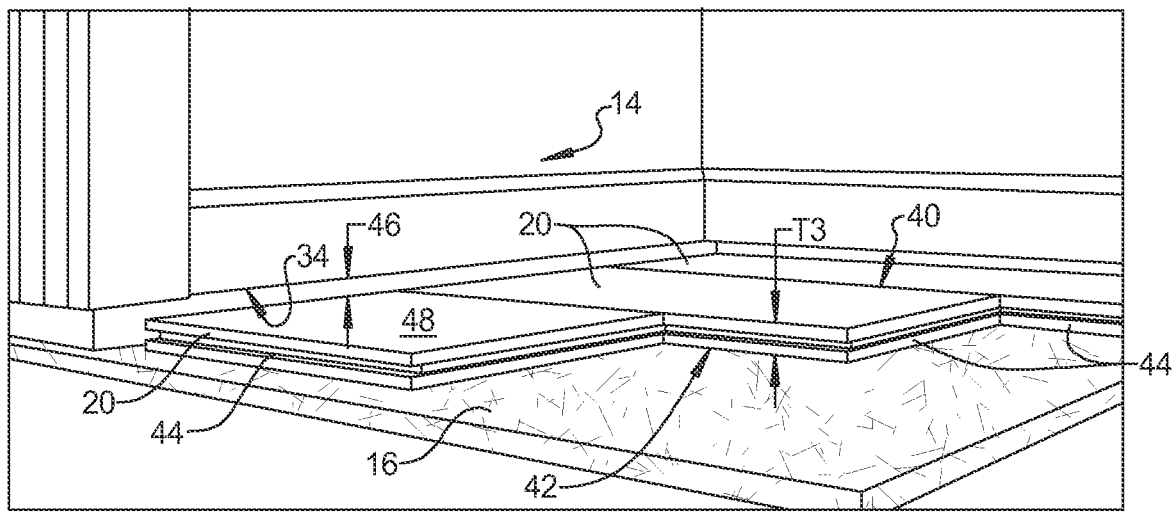
FIG. 2 is a partially sectioned perspective view of another floor structure according to the prior art including a thin floor covering with a backing that yields a small gap between wall trim and the floor structure.

Referring now to FIG. 2, another floor structure 40 according to the prior art is shown adjacent to the wall structure 14. The floor structure 40 includes the subfloor 16 and a floor covering 42 disposed over the subfloor 16. The floor covering 42 includes the planks 20 and a backing 44 attached to the underside surfaces of the planks 20. The backing 44 is includes layers of plywood and may be referred to as a floor lift layer since it raises the height of the planks 20.

The planks 20 and the backing 44 collectively have a thickness T3 that is greater than the thickness T1 of the floor covering 18 of FIG. 1 and less than the thickness T2 of the floor covering 22 of FIG. 1. Thus, while there is a gap 46 between a top surface 48 of the floor covering 18 and the bottom surface 34 of the trim 30, the size of the gap 46 is less than the size of the gap 36 of FIG. 1. While the gap 46 may be eliminated by increasing the thickness of the backing 44, it is difficult to do so without causing an interference between the floor covering 42 and the trim 30 since plywood is supplied in standard thicknesses and is relatively incompressible.

Figure 3:
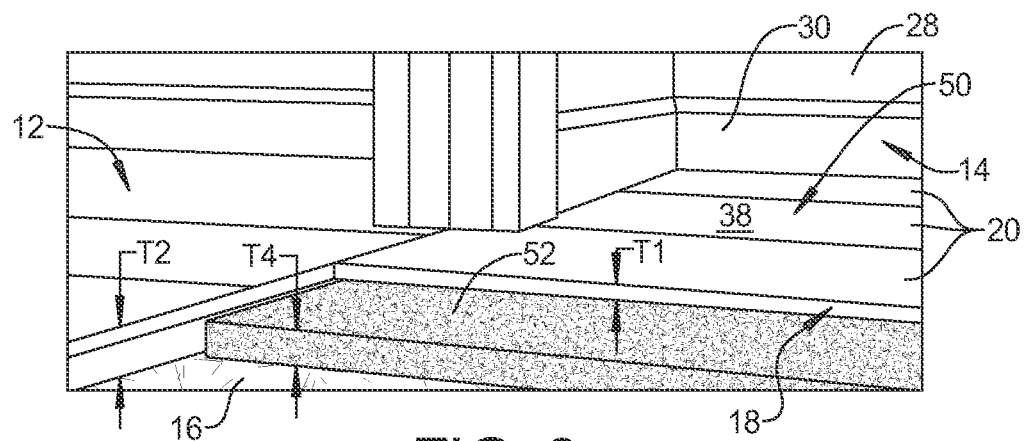
FIG. 3 is a partially sectioned perspective view of a floor structure according to the principles of the present disclosure including the thin floor covering of FIG. 1 and a floor lift layer that raises the floor covering to eliminate a gap between wall trim and the floor structure.

Referring now to FIG. 3, a floor structure 50 according to the present disclosure is shown adjacent to the floor structure 12 and the wall structure 14. The floor structure 50 includes the subfloor 16, the floor covering 18 disposed above the subfloor 16, and a floor lift layer 52 disposed between the subfloor 16 and the floor covering 18. The floor lift layer 52 raises the height of the planks 20 of the floor covering 18 so that the trim 30 seats flush on the floor covering 18 of the floor structure 50 with little to no gap between the top surface 38 of the floor covering 18 and the bottom surface 34 of the trim 30.

The floor lift layer 52 has a thickness T4 that is, for example, within a range from ⅛ inch (in.) to ½ in. (e.g., ⅛ in., 3/16 in., ¼ in., 5/16 in., ⅜ in., 7/16 in., ½ in.). The sum of the thickness T4 of the floor lift layer 52 and the thickness T1 of the floor covering 18 is equal to the thickness T2 of the floor covering 22. Thus, in contrast to the floor structure 10 of FIG. 1, the side surface 26 of the floor covering 22 is not exposed, and therefore the floor structure 50 does not create a trip hazard.

The floor lift layer 52 provides rigidity, sound reduction, and thermal insulation and is lighter than floor lift layers made plywood, cork or rubber. The floor lift layer 52 is sufficiently rigid to enable placing it beneath most types of floor coverings without causing damage to the floor covering due to the floor lift layer 52 compressing under the pressure of normal use (e.g., the weight of person walking). Conversely, the floor lift layer 52 is more compressible than floor lift layers made of more rigid material such as plywood so that the floor lift layer 52 may be compressed to avoid an interference between the floor covering 42 and the trim 30. For example, if the combined thickness of the floor lift layer 52 and the floor covering 18 is greater than the size of the gap between the subfloor 16 and the trim 30, the floor lift layer 52 can be compressed to fit it and the floor covering 18 within that gap. This enables avoiding any gap between the floor covering 18 and the trim 30. In addition, the compressibility of the floor lift layer 52 yields less foot fatigue relative to floor lift layers made of harder material.

In one example, the floor lift layer 52 has a compression resistance within a range from 450 pounds per square inch (psi) at 50 percent (%) compression to 525 psi at 50% compression when tested according to American Society for Testing and Materials (ASTM) D3575. The compressibility of the floor lift layer 52 may be achieved through the density and/or weight of the floor lift layer 52. In one example, the floor lift layer 52 has a density within a range from 18 pounds per cubic feet (lb./ft$^3$) to 24 lb./ft$^3$. In other examples, the floor lift layer 52 has one of the following combinations of thickness and weight: (i) a thickness of ⅛ in. and a weight from 1500 grams per square meter (GSM) to 2000 GSM, (ii) a thickness of ¼ in. and a weight from 2000 GSM to 3000 GSM, and (iii) a thickness of ½ in. and a weight from 4500 GSM to 5000 GSM.

The sound reduction and thermal insulation provided by the floor lift layer 52 is superior to that of floor lift layers made of plywood. In one example, the floor lift layer 52 has an impact insulation class (IIC) within a range from 55 to 80, a sound transmission class (STC) within a range from 52 to 75, and/or a delta IIC within a range from 22 to 28. In one example, the floor lift layer 52 has an R-value within a range from 0.6 to 0.9. The floor lift layer 52 may have an R-value within a range from 3.5 to 4 per inch. For example, the floor lift layer 52 may have one of the following combinations of thickness and R-value: (i) a thickness of ⅛ in. and an R-value within a range from 0.4 to 0.5, (ii) a thickness of ¼ in. and an R-value within a range from 0.875 to 1, and (iii) a thickness of ½ in. and an R-value within a range from 1.8 to 2. While the floor lift layer 52 is suitable for use with a floor covering having an underlayment backing, the sound reduction and thermal insulation provided by the floor lift layer 52 eliminates the need to use a floor underlayment between the floor covering and the floor lift layer 52.

The materials from which the floor lift layer 52 is made, and the way in which the floor lift layer 52 is made, yield the rigidity, sound reduction, thermal insulation, and weight properties listed above. The floor lift layer 52 is a fiber structure that includes a substrate fiber bound together by a thermoplastic binder fiber. The substate fiber may include thermoplastic fiber such as polyethylene terephthalate (PET) fiber, polypropylene (PP) fiber, nylon fiber, or combinations thereof. Additionally or alternatively, the substrate fiber may include cellulose fiber such as hemp fiber, cotton fiber, and/or paper fiber. The thermoplastic binder fiber may be a bicomponent fiber with, for example, a PP core and a PE sheath surrounding the PP core.

In one example, the floor lift layer 52 includes 48% of short PET fiber by weight, 9% of PP fiber by weight, 3% of nylon by weight, 30% of binder fiber by weight, and 10% of long PET fiber by weight. In other examples, the percentages by weight of the short PET fiber, the PP fiber, the nylon fiber, and the long PET fiber may be within a range of +/−5%, +/−10%, or +/−20% relative to the above percentages. The length of the nylon fiber and the PET fiber may be within a range from 2 mm to 20 mm. The length of the short PET fiber may be within a range from 2 millimeters (mm) to 10 mm. The length of the long PET fiber may be within a range from 10 mm to 20 mm.

To manufacture the floor lift layer 52, the various types of fibers discussed above are mixed to form a fiber mixture and passed through a compression-type oven. The oven compresses the fiber mixture while heating the fiber mixture. As the oven heats the fiber mixture, the PE sheath of the bicomponent fiber melts and forms a coating covering most of the fibers in the mixture. After the fiber mixture exits the oven, the fiber mixture is cooled, and the melted PE solidifies and binds the fibers together to form a fiber structure. The fiber structure may be cut into fiber panels having various sizes, such as 2 feet (ft.) by 3 ft., 3 ft. by 5 ft., or 4 ft. by 6 ft., and the fiber panels may be installed with their ends abutting one another to form the floor lift layer 52. The floor lift layer 52 can be floated, stapled, or glued under floating floor coverings.

To ensure that the floor lift layer 52 has a density within the density range discussed above, the percentages by weight of short PET fiber and binder fiber in the floor lift layer 52 are greater than those of fiber structures that are less dense, such a fiber underlayment. In addition, the amount of compression applied by the oven when making the floor lift layer 52 is greater than the amount of compression applied by the oven when making less dense fiber structures. This may be accomplished by mixing together a greater amount of fiber than is mixed to make less dense fiber structures, and passing the fiber mixture through the oven at a desired minimal thickness. In one example, the amount of fiber used to make the floor lift layer 52 is within a range from 40% to 60% greater than the amount of fiber used to make less dense fiber structures.

Figure 4:
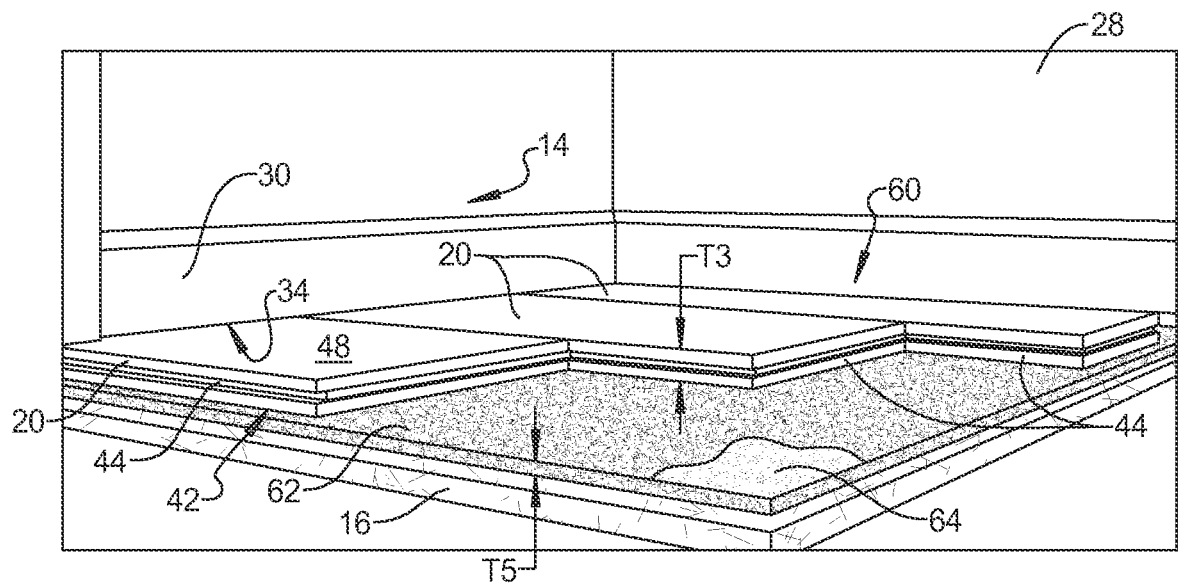
FIG. 4 is a partially sectioned perspective view of a floor structure according to the principles of the present disclosure including the thin floor covering with the backing of FIG. 2 and a floor lift layer that raises the floor covering to eliminate a gap between wall trim and the floor structure.

Referring now to FIG. 4, another floor structure 60 according to the present disclosure is shown adjacent to the wall structure 14. The floor structure 60 includes the subfloor 16, and the floor covering 42 disposed above the subfloor 16, and a floor lift layer 62 disposed between the subfloor 16 and the floor covering 42. The floor lift layer 62 raises the height of the planks 20 of the floor covering 42 so that the trim 30 seats flush on the floor covering 42 of the floor structure 60 with little to no gap between the top surface 48 of the floor covering 42 and the bottom surface 34 of the trim 30.

The floor lift layer 62 has a thickness T5, which may be within a range from ⅛ in. to ½ in. The sum of the thickness T5 of the floor lift layer 62 and the thickness T3 of the floor covering 42 is equal to the thickness T2 of the floor covering 22 of FIG. 3. Thus, the side surface 26 of the floor covering 22 is not exposed and, in contrast to the floor structure 40 of FIG. 2, the floor structure 60 does not create a trip hazard.

The thickness T5 of the floor lift layer 62 is less than the thickness T4 of the floor lift layer 52 of FIG. 3. The difference between the thickness T5 of the floor lift layer 62 and the thickness T4 of the floor lift layer 52 is equal to the thickness of the backing 44 attached to the underside surfaces of the planks 20. All other properties of the floor lift layer 62 may be similar or identical to those of the floor lift layer 52. For example, the density, compression resistance, IIC, STC, delta-IIC, and/or R-value of the floor lift layer 62 may be within the ranges discussed above in connection with the floor lift layer 52.

In addition, the floor lift layer 62 may be made from the same types of fiber materials as the fiber material types from which the floor lift layer 52 may be made. Furthermore, the percentages of each type of fiber used to make the floor lift layer 62 may be within the same ranges as the fiber percentages discussed above in connection with the floor lift layer 52. Moreover, the floor lift layer 62 may be made in the same way as the floor lift layer 52, including using a large amount of fiber per unit thickness to increase the amount of compression applied to the fiber mixture by the oven.

In various implementations, a vapor barrier film 64 may be attached to the top and/or bottom surface(s) of the floor lift layer 62 using, for example, an adhesive. Although FIG. 4 shows the vapor barrier film 64 covering only part of the top surface of the floor lift layer 62, the vapor barrier film 64 may cover the entire top and/or bottom surface(s) of the floor lift layer 62. The vapor barrier film 64 inhibits or prevents moisture from travelling through the floor lift layer 62 and/or to the subfloor 16. The vapor barrier film 64 may be made of linear low-density polyethylene (LLDPE), high-density polyethylene (HDPE), tie, polyamide (pa), nylon, metallocene, or combinations thereof. The vapor barrier film 64 may have a thickness within a range from 1 mil to 3 mils.

The adhesive used to attach the vapor barrier film 64 to the floor lift layer 62 may be a high viscosity, low melting point adhesive that is applied hot and forms a bond as it cools (i.e., a "hot melt" adhesive). Such adhesives are available from H. B. Fuller, from Swift Adhesive, and from Western Adhesive (the Western Adhesive product is sold under the product name of RHM542.) Alternatively, any other adhesive capable of bonding the vapor barrier film 64 to the floor lift layer 62 may be used. Although the vapor barrier film 64 is only shown in FIG. 4, the vapor barrier film 64 may be attached to top and/or bottom surface(s) the floor lift layer 52 of FIG. 3 in the same way.

In various implementations, each floor lift layer 52, 62 with the vapor barrier film 64 attached thereto may have a permeability rating of less than 0.1 when tested, for example, according to ASTM E96 Standard Test Methods for Water Vapor Transmission of Materials. Therefore, each floor lift layer 52, 62 with the vapor barrier film 64 attached thereto may be a Class 1 vapor barrier. In various implementations, the floor lift layers 52, 62 may have a fire rating of Class C or better. To accomplish this, the substrate fiber and/or the thermoplastic binder fiber of the floor lift layers 52, 62 may be treated with a fire-retardant coating or the substrate fiber may be made from a fiber that is a natural fire retardant such as hemp or a similar type of fiber.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A floor structure comprising:
   a subfloor;
   a floor covering disposed above the subfloor; and
   a floor lift layer disposed between the subfloor and the floor covering, the floor lift layer having at least one of (i) a top surface exposed to the floor covering and (ii) a bottom surface exposed to the subfloor, wherein the floor lift layer is a fiber structure that consists of a substrate fiber and a thermoplastic binder fiber, the substrate fiber being bound together by the thermoplastic binder fiber, the thermoplastic binder fiber making up between 25 percent (%) and 35% by weight of the floor lift layer.

2. The floor structure of claim 1 wherein the substrate fiber includes polyethylene terephthalate (PET) fiber, polypropylene (PP) fiber, nylon fiber, or combinations thereof.

3. The floor structure of claim 1 wherein the substrate fiber includes short PET fiber having a length within a range from 2 millimeters (mm) to 10 mm and long PET fiber having a length within a range from 10 mm to 20 mm.

4. The floor structure of claim 3 wherein the floor lift layer includes between 28% and 68% by weight of the short PET fiber.

5. The floor structure of claim 3 wherein the substrate fiber further includes polypropylene (PP) fiber and nylon fiber.

6. The floor structure of claim 5 wherein the floor lift layer includes between 43% and 53% by weight of the short PET fiber.

7. The floor structure of claim 1 further comprising a vapor barrier film attached to one of the top surface of the floor lift layer and the bottom surface of the floor lift layer.

8. The floor structure of claim 7 wherein the floor lift layer and the vapor barrier film attached thereto have a permeability rating of less than 0.1.

9. The floor structure of claim 1 wherein at least one of:
   at least one of the substrate fiber and the thermoplastic binder fiber is treated with a fire retardant coating; and
   the substrate fiber includes fiber that is naturally a fire retardant.

10. The floor structure of claim 1 wherein the thermoplastic binder fiber is a bicomponent fiber with a polypropylene (PP) core and a polyethylene (PE) sheath surrounding the PP core.

11. A floor structure comprising:
    a subfloor;
    a floor covering disposed above the subfloor; and
    a floor lift layer disposed between the subfloor and the floor covering, the floor lift layer having at least one of (i) a top surface exposed to the floor covering and (ii) a bottom surface exposed to the subfloor, wherein the floor lift layer is a fiber structure that consists of a substrate fiber and a thermoplastic binder fiber, the substrate fiber being bound together by the thermoplastic binder fiber, wherein the floor lift layer has a compression resistance within a range from 450 pounds per square inch (psi) at 50% compression to 525 psi at 50% compression.

12. The floor structure of claim 11 wherein the floor lift layer has a density within a range from 18 pounds per cubic feet (lb/ft$^3$) to 24 lb./ft$^3$.

13. The floor structure of claim 11 wherein the floor lift layer has one of:
 a thickness of 1/8 in. and a weight from 1500 grams per square meter (GSM) to 2000 GSM;
 a thickness of 1/4 in. and a weight from 2000 GSM to 3000 GSM; and
 a thickness of 1/2 in. and a weight from 4500 GSM to 5000 GSM.

14. The floor structure of claim 11 wherein the floor lift layer has at least one of:
 an impact insulation class (IIC) within a range from 55 to 80;
 a sound transmission class (STC) within a range from 52 to 75; and
 a delta IIC within a range from 22 to 28.

15. The floor structure of claim 11 wherein the floor lift layer has an R-value within a range from 3.5 to 4 per inch (in.).

16. The floor structure of claim 11 wherein the floor lift layer has a thickness within a range from 1/8 in. to 1/2 in.

17. The floor structure of claim 11 wherein:
 the floor lift layer includes short polyethylene terephthalate (PET) fiber, long PET fiber, polypropylene (PP) fiber, nylon fiber; and
 the short PET fiber has a length within a range from 2 millimeters (mm) to 10 mm and makes up between 43% and 53% by weight of the fiber structure; and
 the long PET fiber has a length within a range from 10 mm to 20 mm.

18. A fiber board for a building structure, the fiber board comprising a fiber structure that consists of a substrate fiber and a thermoplastic binder fiber, the substrate fiber being bound together by the thermoplastic binder fiber, the thermoplastic binder fiber making up between 25 percent (%) and 35% by weight of the fiber board, the substrate fiber including short polyethylene terephthalate (PET) fiber, long PET fiber, polypropylene (PP) fiber, and nylon fiber, the short PET fiber having a length within a range from 2 millimeters (mm) to 10 mm and making up between 43% and 53% by weight of the fiber board, the long PET fiber having a length within a range from 10 mm to 20 mm.

19. The fiber board of claim 18 further comprising a vapor barrier film attached a surface of the fiber structure.

\* \* \* \* \*